(12) United States Patent
Jiang et al.

(10) Patent No.: US 6,498,875 B1
(45) Date of Patent: Dec. 24, 2002

(54) OPTICAL CONNECTOR FOR CONNECTING A PLURALITY OF LIGHT SOURCES TO A PLURALITY OF LIGHT SINKS

(75) Inventors: Wenbin Jiang, Thousand Oaks, CA (US); Tom D. Milster, Tucson, AZ (US)

(73) Assignee: E20 Communications Inc., Calabasas, CA (US)

( * ) Notice: Subject to any disclaimer, the term of this patent is extended or adjusted under 35 U.S.C. 154(b) by 0 days.

(21) Appl. No.: 09/563,601

(22) Filed: May 1, 2000

(51) Int. Cl.$^7$ ................................................. G02B 6/32
(52) U.S. Cl. ............................ 385/33; 385/31; 385/39; 385/15
(58) Field of Search ........................... 385/44, 45, 46, 385/16, 17, 18, 31, 33, 35, 36, 11, 15, 39, 40, 34

(56) References Cited

U.S. PATENT DOCUMENTS

| | | | |
|---|---|---|---|
| 4,701,010 A | * 10/1987 | Roberts | 350/96.15 |
| 4,948,229 A | * 8/1990 | Soref | 350/96.18 |
| 5,477,350 A | * 12/1995 | Riza | 359/39 |
| 5,740,288 A | * 4/1998 | Pan | 385/11 |
| 5,748,812 A | * 5/1998 | Buchin | 385/18 |
| 6,142,680 A | * 10/2000 | Kikuchi | 385/93 |
| 6,282,025 B1 | * 8/2001 | Huang | 359/11 |

FOREIGN PATENT DOCUMENTS

| | | | |
|---|---|---|---|
| WO | WO-9941858 A1 | * 8/1999 | H04B/10/135 |

OTHER PUBLICATIONS

Jeff Hecht, Understanding Riber Optics, Jun. 1999, Prentice Hall, Third Edition, pp. 174–175 & 209–211.*

* cited by examiner

*Primary Examiner*—Brian Healy
*Assistant Examiner*—Kevin S. Wood
(74) *Attorney, Agent, or Firm*—Robert E. Malm

(57) ABSTRACT

The invention is a method and apparatus for transmitting the light from one or more transmitting arrays of optical devices to one or more receiving arrays of optical devices where each optical device in a transmitting array transmits an initially diverging light beam to a single optical device in a receiving array. Each optical device in a receiving array receives a converging light beam from a single optical device in a transmitting array. The method consists of imaging the optical devices in one or more transmitting arrays on the optical devices in one or more receiving arrays. The light rays from each optical device in a transmitting array are superimposed on the light rays from the other optical devices in the transmitting array while traversing a common volume.

31 Claims, 2 Drawing Sheets

OPTICAL CONNECTOR FOR CONNECTING A PLURALITY OF LIGHT SOURCES TO A PLURALITY OF LIGHT SINKS

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to methods and apparatus for directing the light produced by a plurality of light sources to a plurality of light sinks and more specifically to methods and apparatus for connecting arrays of light sources to arrays of light sinks.

The tremendous information-carrying capacity of light beams is stimulating the development of the hardware building blocks for communication systems of a variety of types. A variety of devices are presently available for the generation and detection of light for communication purposes. Moreover, these devices tend to be small, and the available manufacturing technology permits these devices to be fabricated precisely and economically into large-scale arrays.

What is not so readily available are the means for economically interconnecting arrays of these devices. The interconnection means of choice at the present time, particularly for long distances, is the fiber-optic cable consisting of a plurality of optical fibers held together by a flexible matrix. After decades of development, the connection of fiber-optic cables to optical devices remains a costly labor-intensive exercise.

It is becoming increasingly desirable to connect optical devices to other optical devices on the same printed-circuit board. For this purpose, guiding light beams from one array of optical devices to another array using waveguides have been explored during the past decade. The idea is to provide a waveguide between each pair of devices to be connected. Short-length fiber-optic cables are one possible way in which arrays of optical devices can be connected together.

Rather than using ready-made short-length fiber-optic cables to connect optical devices on a printed-circuit board, one might use custom-fabricated arrays of optical waveguides on suitable substrates. The manufacturing process for optical waveguide arrays is similar, at least in some respects, to the manufacturing process for integrated circuits. However, even though the integrated-circuit manufacturing process is complex, it is also cost-effective when amortized over millions of integrated circuits. Optical connectors based on arrays of optical waveguides are unlikely to have the market potential of commodity-type integrated circuits and will, for this reason, be significantly less cost-effective than the typical integrated circuit.

There is a continuing need for optical connectors that are as cost-effective as printed-circuit boards are for connecting arrays of electronic devices.

BRIEF SUMMARY OF THE INVENTION

The invention is a method and apparatus for transmitting the light from one or more transmitting arrays of optical devices to one or more receiving arrays of optical devices where each optical device in a transmitting array transmits an initially diverging light beam to a single optical device in a receiving array. Each optical device in a receiving array receives a converging light beam from a single optical device in a transmitting array. The method consists of imaging the optical devices in one or more transmitting arrays on the optical devices in one or more receiving arrays. The light rays from each optical device in a transmitting array are superimposed on the light rays from the other optical devices in the transmitting array while traversing a common volume.

DETAILED DESCRIPTION OF THE INVENTION

The basic function of the optical connector claimed herein is to funnel light from one or more transmitting arrays of optical devices to one or more receiving arrays of optical devices. A requirement that accompanies this basic function is (1) that each optical device in a transmitting array transmits light to a single optical device in a receiving array and (2) that each optical device in a receiving array receives light from a single optical device in a transmitting array.

The optical connector is basically an imaging system that for each optical device in a transmitting array images the exit aperture of the optical device (e.g. the aperture through which a VCSEL emits light) on the entry aperture of a receiving-array optical device (e.g. the aperture that defines the light-sensitive region of a photodiode) or on the end of an optical fiber.

The imaging process that is the subject of this invention is one where the diverging light rays from the optical devices in a transmitting array enter and then travel through a common volume together until they are subjected to a focusing process which brings about the separation of the light rays so that the light rays originating from a particular optical device in the transmitting array are focused on a particular optical device in the receiving array. The light-ray bundles from the transmitting-array optical devices travel together in a superimposed fashion through the common volume until they approach the receiving-array optical devices whereupon the light-ray bundles are once again separated into individual beams and imaged on individual receiving-array optical devices.

One might accomplish a similar result using a bundle of optical fibers with each fiber in the bundle connecting a particular optical device in the transmitting array to a particular optical device in the receiving array. Note that the light rays from a transmitting-array optical device is channeled to a receiving-array optical device through an optical fiber that services only one transmitting-array optical device. The light-ray bundles from the transmitting-array optical devices remain isolated from one another by being constrained to propagate through individual optical fibers. The light-ray bundles from the transmitting-array optical devices do not enter and then travel through a common volume together until they are finally separated and focused on the individual receiving-array optical devices, as is the case of the present invention.

Figure 1:
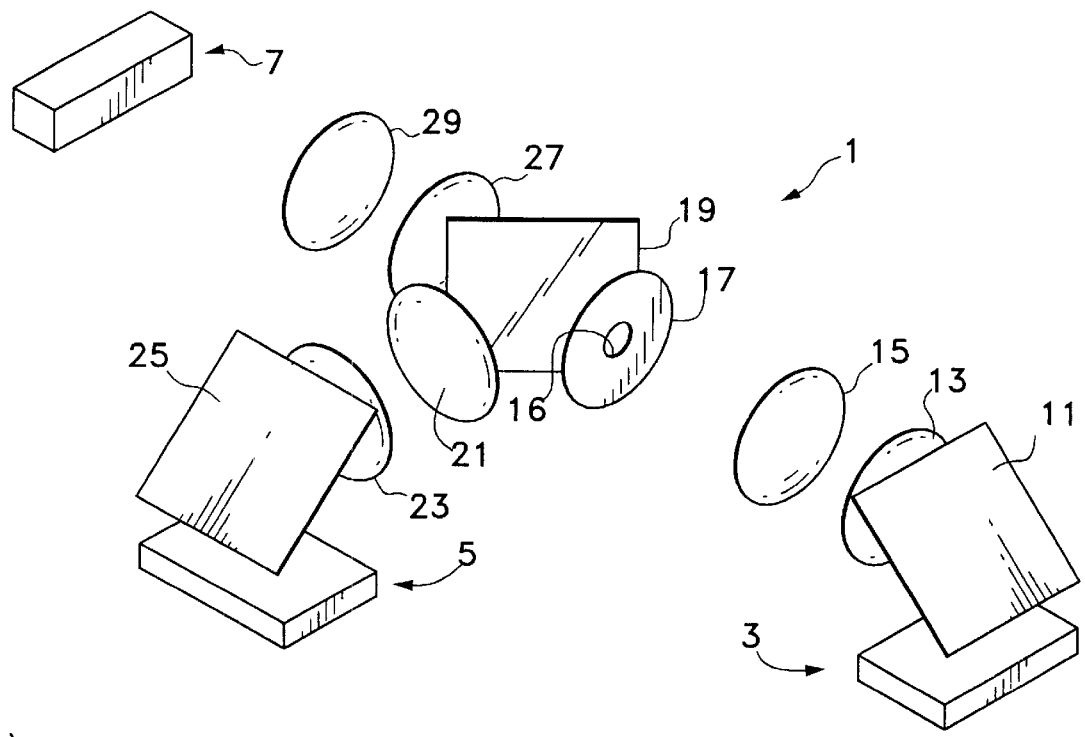
FIG. 1 is a schematic of an optical system that illustrates the conceptual basis of the invention.

The conceptual basis for the present invention is illustrated in FIG. 1 by an optical system 1 that funnels light from an array of vertical-cavity surface-emitting lasers (VCSELs) 3 to an array of photodiodes 5 and to the ends of the optical fibers in a fiber-optic cable held in a fiber-optic cable connector 7.

The diverging light rays from the VCSEL array 3 of FIG. 1 propagate in a generally vertical direction to reflecting surface 11 and then continue after reflection from reflecting surface 11 in a generally horizontal direction to lenses 13 and 15 which collimate the light rays from the individual VCSELs.

In many situations, because of the locations and orientations of the transmitting and receiving arrays of optical devices, it is necessary to change the directions of propagation of the light rays one or more times as they pass through a common volume. These changes in direction can conveniently be accomplished through the use of reflecting surfaces or mirrors.

Still another way of bringing about a change in propagation direction is by using refraction whereby the light rays passing through a planar surface between two mediums having different indices of refraction experience a change in direction of propagation. The classic refraction-based device for accomplishing a change in direction of propagation is the prism.

An on-axis VCSEL is the one that emits a light ray that ends up collinear with the optical axis of lenses 13 and 15. The bundle of diverging light rays from an on-axis VCSEL device is collimated by lenses 13 and 15 so that all of the rays are parallel to the optical axis of the lenses.

The bundle of diverging light rays from an off-axis VCSEL device is collimated by lenses 13 and 15 so that so that all of the rays are parallel but make an angle with respect to the optical axis that is proportional to the distance between the off-axis and the on-axis VCSEL devices.

The collimated light from the VCSELs passes through the hole 16 in aperture plate 17 which blocks scattered light and light from the peripheries of lenses 13 and 15.

The VCSEL bundles of light rays that pass through the hole 16 in aperture plate 17 are split into two sets of bundles by beam splitter 19. One set of bundles is reflected by beam splitter 19, focused by lenses 21 and 23, and directed toward the photodiode array 5 as a result of being reflected from reflecting surface 25. The design of lenses 21 and 23 causes the light rays originating from a particular VCSEL to be focused on a particular photodiode.

The set of bundles that pass through beam splitter 19 are focussed by lenses 27 and 29 on the ends of a fiber-optic cable being held in the fiber-optic cable connector 7 and as a result, enter the optical fibers and are propagated to whatever devices are connected to the other ends of the optical fibers in the fiber-optic cable.

Figure 2:
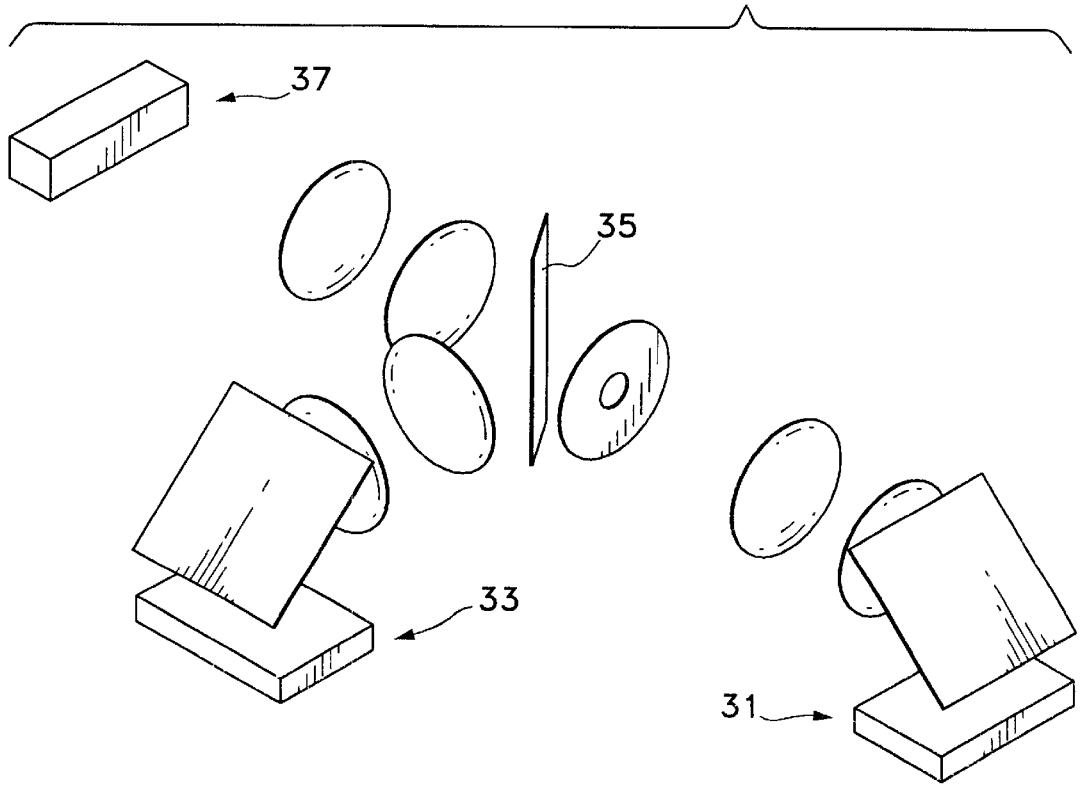
FIG. 2 shows a variation of the optical system shown in FIG. 1.

Another embodiment of the invention is illustrated in FIG. 2 wherein the light-ray bundles from two VCSEL arrays 31 and 33 are combined by means of combiner 35 and focused on the ends of a fiber-optic cable being held in the fiber-optic cable connector 37. All of the un-numbered components in FIG. 2 play roles similar to those of corresponding components in FIG. 1. The focusing function of lenses 21 and 23 in FIG. 1 becomes a collimating function in FIG. 2 where the bundles of light originate in VCSEL array 33.

Figure 3:
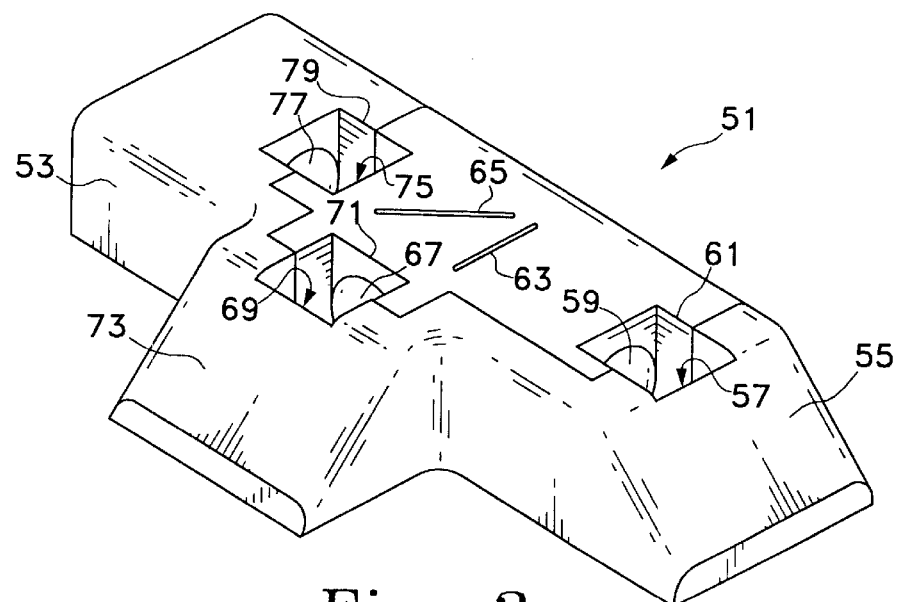
FIG. 3 shows an embodiment of the invention.

An embodiment of an optical connector 51 based on the optical system 1 of FIG. 1 is shown in FIG. 3. The optical-connector housing 53 provides the structure for supporting the optical-system components and may also collaborate in other ways with the individual optical components in performing the functions required of the optical system.

The optical-connector housing 53 is made of a material such as an epoxy, plastic, or polyimide and in the preferred embodiment is optically transparent. In other embodiments, the housing 53 may be opaque. In the preferred embodiment, the optical-connector housing 53 is a solid body except for certain cavities visible in FIG. 3. In other embodiments, the housing 53 may simply be an open structure that provides support for the optical-system components.

The function of reflecting surface 11 in FIG. 1 is accomplished by total internal reflection from surface 55 of the optical-connector housing 53 in FIG. 3. Lens 57 (not visible in FIG. 3) and lens 59 correspond to the planar-convex lenses 13 and 15 of FIG. 1 and are attached on opposite sides of cavity 61, planar surface to planar surface.

The aperture plate 17 and the beam splitter 19 of FIG. 1 slide respectively into slot 63 and slot 65 of optical-connector housing 53 of FIG. 3 and fastened with either a snap-fit or an adhesive.

Lens 67 and lens 69 (not visible in FIG. 3) correspond to the planar-convex lenses 21 and 23 of FIG. 1 and are attached on opposite sides of cavity 71, planar surface of lens to planar surface of cavity. The function of reflecting surface 25 in FIG. 1 is accomplished by total internal reflection from surface 73 of the optical-connector housing 53 in FIG. 3.

Lens 75 (not visible in FIG. 3) and lens 77 correspond to the planar-convex lenses 27 and 29 of FIG. 1 and are attached on opposite sides of cavity 79, planar surface of lens to planar surface of cavity.

Figure 4:
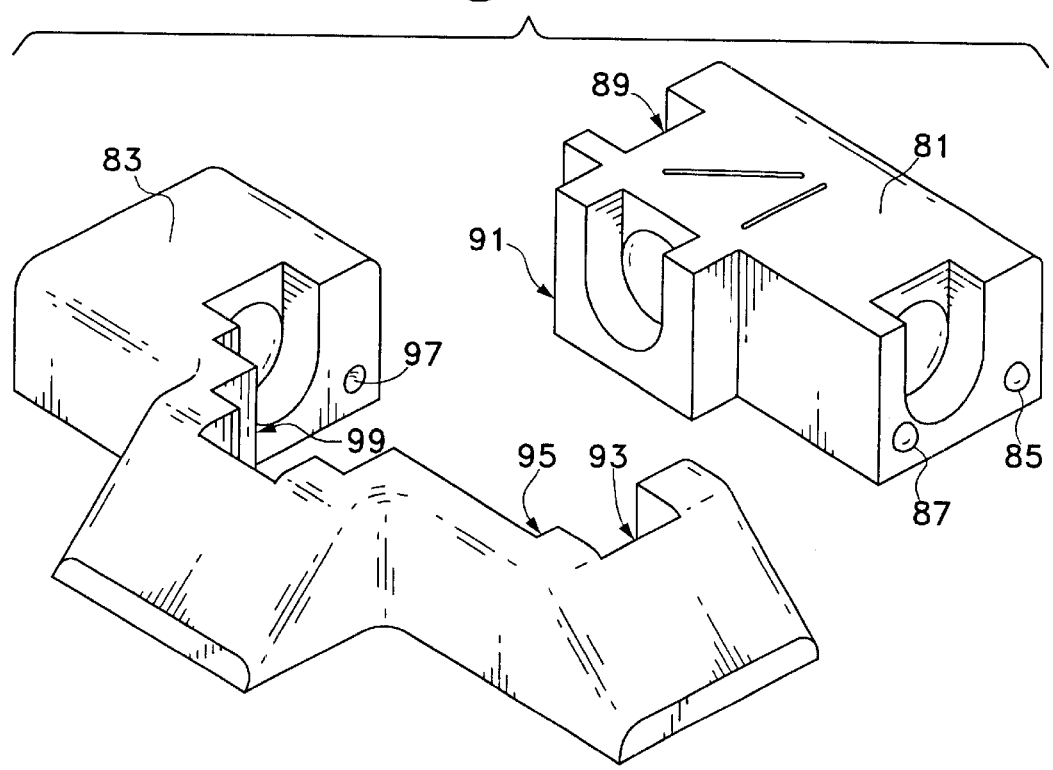
FIG. 4 shows two members that can be assembled into the embodiment of FIG. 3.

The optical-connector housing 53 is fabricated by an injection molding process. To ease the installation of the lenses into the optical-connector housing, the housing is molded in two members 81 and 83 as shown in FIG. 4. Each member contains one-half of lens cavities 61, 71, and 79 so that each of the lenses 57, 59, 67, 69, 75, and 77, can be easily positioned and adhesively attached to the sides of the cavities prior to assembling the two members 81 and 83.

Member 81 is provided with resilient protuberances 85, 87, 89 (not visible in FIG. 4), and 91 (not visible in FIG. 4) that mate with recesses 93 (not visible in FIG. 4), 95 (not visible in FIG. 4), 97, and 99 (not visible in FIG. 4) in part 83 when members 81 and 83 are pushed together thereby assuring the precise alignment of members 81 and 83 with respect to each other.

The VCSEL array and the photodiode array are typically in the form of integrated circuits that must be precisely mounted on a printed circuit board in accordance with the mating requirements of the optical connector. The optical connector is then mounted on the printed circuit board over and in precise alignment with the VCSEL array and the photodiode array. Techniques for accomplishing these tasks are well-known and may involve the use of templates, special jigs, and automation. Attachment will typically be accomplished using adhesives.

The fiber-optic cable must also be precisely aligned and attached to the optical connector. Typically, a fiber-optic cable connector is attached to the end of the fiber-optic cable and holds the optical fibers in precise alignment. The fiber-optic cable connector is then precisely aligned with and attached to the optical connector, typically by a mechanical latching means.

What is claimed is:

1. A method for transmitting the light from one or more transmitting arrays of optical devices to one or more receiving arrays of optical devices, all of the optical devices in a transmitting array delivering light in a same general first direction, all of the optical devices in a receiving array receiving light from a same general second direction, each optical device in a transmitting array transmitting a diverging light beam, the diverging light beams of adjacent optical devices co-existing in whole or in part in the same optical space, each optical device in a transmitting array transmitting light to a single optical device in a receiving array, each optical device in a receiving array receiving a converging light beam, each optical device in a receiving array receiving light from a single optical device in a transmitting array, the method comprising the step:

imaging the optical devices in one or more transmitting arrays on the optical devices in one or more receiving arrays, the light rays emitted by the optical devices having non-zero bandwidths, all changes in directions of light rays being accomplished by reflection and/or refraction at surfaces, reflection being characterized by a process whereby the angle of incidence equals the angle of reflection with respect to a surface for all frequency components of the light ray, refraction being characterized by a process whereby the sine of the angle of incidence times the index of refraction equals the sine of the angle of refraction times the index of refraction with respect to a surface that separates two regions having different indices of refraction for all frequency components of the light ray, the light rays from each optical device in a transmitting array being superimposed on the light rays from the other optical devices in the transmitting array while traversing a common volume.

2. The method of claim 1 wherein the transmitting arrays and the receiving arrays are planar arrays, the receiving arrays having specified orientations with respect to the transmitting arrays.

3. The method of claim 1 wherein the optical devices in a transmitting array are vertical-cavity surface-emitting lasers.

4. The method of claim 1 wherein the optical devices in a transmitting array or a receiving array are the ends of the optical fibers in a fiber-optic cable, the light beams emerging from the ends of adjacent optical fibers simultaneously emerging, diverging, and co-existing in whole or in part in the same optical space.

5. The method of claim 1 wherein the optical devices in a receiving array are photodiodes.

6. The method of claim 1 wherein the step comprises the steps:

collimating the diverging light beams from the optical devices in a transmitting array into collimated beams co-existing in the same optical space immediately after being collimated;

focusing the collimated beams from the optical devices in the transmitting array on the optical devices in a receiving array.

7. The method of claim 6 further comprising the steps:

splitting the collimated beams of light into first and second sets of collimated beams of light;

focusing the first set of collimated beams on the optical devices in a first receiving array;

focusing the second set of collimated beams on the optical devices in a second receiving array.

8. The method of claim 1 wherein the step comprises the step:

changing the directions of the diverging beams of light from the optical devices in a transmitting array.

9. The method of claim 1 wherein the step comprises the steps:

transforming beams of light originating in the optical devices in a transmitting array into converging beams of light that are brought to a focus in a first plane;

changing the directions of the converging beams of light so that the converging beams of light are focused on the optical devices in a receiving array in a second plane.

10. The method of claim 1 wherein the step comprises the steps:

transforming beams of light originating in the optical devices in a transmitting array into collimated beams of light;

limiting the lateral dimensions of the collimated beams of light.

11. Apparatus for practicing the method of claim 1.

12. Apparatus for transmitting the light from one or more transmitting arrays of optical devices to one or more receiving arrays of optical devices, all of the optical devices in a transmitting array delivering light in a same general first direction, all of the optical devices in a receiving array receiving light from a same general second direction, each optical device in a transmitting array transmitting diverging light rays, each optical device in a transmitting array transmitting light to a single optical device in a receiving array, each optical device in a receiving array receiving converging light rays, each optical device in a receiving array receiving light from a single optical device in a transmitting array, the apparatus comprising:

an optical system wherein the light rays emitted by the optical devices have non-zero bandwidths, all changes in directions of light rays being accomplished by reflection and/or refraction at surfaces, reflection being characterized by a process whereby the angle of incidence equals the angle of reflection with respect to a surface for all frequency components of the light ray, refraction being characterized by a process whereby the sine of the angle of incidence times the index of refraction equals the sine of the angle of refraction times the index of refraction with respect to a surface that separates two regions having different indices of refraction for all frequency components of the light ray, the optical system including a lens associated with each transmitting array, the light from a transmitting array entering the optical system through the lens associated with the transmitting array;

a housing containing the optical system.

13. The apparatus of claim 12 wherein the optical system comprises:

a collimating lens system which transforms the diverging light rays from each of the optical devices in a transmitting array into collimated rays of light;

a focusing lens system which transforms the collimated rays of light from each of the optical devices in a transmitting array into converging rays of light that are brought to focus on the optical devices in a receiving array.

14. The apparatus of claim 12 wherein the optical system comprises:

a collimating lens system which transforms the diverging light rays from each of the optical devices in a transmitting array into collimated light rays;

a beam splitter which splits the collimated light rays from each of the optical devices in a transmitting array into first and second bundles of collimated light rays;

a first focusing lens system which transforms the first bundle of collimated light rays from each of the optical devices in the transmitting array into converging light rays that are brought to focus on the optical devices in a first receiving array;

a second focusing lens system which transforms the second bundle of collimated light rays from each of the optical devices in the transmitting array into converging light rays that are brought to focus on the optical devices in a second receiving array.

15. The apparatus of claim 12 wherein the optical system comprises:

a first collimating lens system which transforms the diverging light rays from each of the optical devices in a first transmitting array into a first bundle of collimated light rays;

a second collimating lens system which transforms the diverging light rays from each of the optical devices in a second transmitting array into a second bundle of collimated light rays;

a combiner which combines the first bundle of collimated light rays from each of the optical devices in a first transmitting array and the second bundle of collimated light rays from each of the optical devices in a second transmitting array into single bundles of collimated light rays;

a focusing lens system which transforms the single bundles of collimated light rays into bundles of converging light rays which are brought to focus on the optical devices in a receiving array.

16. The apparatus of claim 12 wherein the optical system comprises:

a reflecting surface which changes the direction of the diverging light rays from each of the optical devices in the transmitting array.

17. The apparatus of claim 12 wherein the optical system comprises:

a reflecting surface which changes the directions of the converging light rays, thereby causing the converging light rays to be brought to focus on the optical devices of a receiving array.

18. The apparatus of claim 13 wherein the optical system comprises:

an aperture plate that limits the lateral dimensions of the collimated light rays.

19. The apparatus of claim 12 wherein the housing is adapted to admit light from one or more transmitting arrays of optical devices into the optical system and to deliver light from the optical system to one or more receiving arrays of optical devices.

20. The apparatus of claim 12 wherein the optical system comprises one or more lens systems, each lens system being affixed within a slot that extends from a surface of the housing into the interior of the housing.

21. The apparatus of claim 20 wherein a lens system consists of two lens affixed to opposite sides of a slot.

22. The apparatus of claim 12 wherein the optical system comprises one or more beam splitters, each beam splitter occupying a slot extending from a surface of the housing into the interior of the housing.

23. The apparatus of claim 12 wherein the optical system comprises one or more combiners, each combiner occupying a slot extending from a surface of the housing into the interior of the housing.

24. The apparatus of claim 12 wherein the optical system comprises one or more aperture plates, each aperture plate occupying a slot extending from a surface of the housing into the interior of the housing.

25. The apparatus of claim 12 wherein the optical system comprises one or more mirrors, a mirror occupying a slot extending from a surface of the housing into the interior of the housing.

26. The apparatus of claim 12 wherein the housing is transparent and the optical system comprises one or more reflecting surfaces, at least one of the reflecting surfaces being an external surface of the housing, light rays incident on the external surface from within the housing experiencing total internal reflection from the external surface.

27. The apparatus of claim 12 wherein the housing consists of a plurality of members, each of at least two of the members holding one or more of the components of the optical system, the plurality of members fitting together in a prescribed configuration to form the housing, the plurality of members incorporating one or more attachment devices that facilitate the assembly of the members into a housing by pressing the members together into the prescribed configuration.

28. The apparatus of claim 12 wherein the housing consists of a plurality of members and the optical system comprises one or more lens systems, each lens system being affixed within a cavity that extends from a surface of the housing into the interior of the housing, each lens system consisting of two separate lenses, each member containing only one lens of a lens system.

29. The apparatus of claim 12 wherein the path traveled by a light ray from an optical device in a transmitting array to an optical device in a receiving array is through air.

30. The apparatus of claim 12 wherein at least a part of the path traveled by a light ray from an optical device in a transmitting array to an optical device in a receiving array is through a solid portion of the housing.

31. The apparatus of claim 12 wherein the housing is a solid body except for cavities containing lens systems and slots containing other optical components.

* * * * *